No. 611,876. Patented Oct. 4, 1898.
M. WALSH.
RACE TRACK FOR DOGS.
(Application filed Sept. 28, 1897.)
(No Model.)
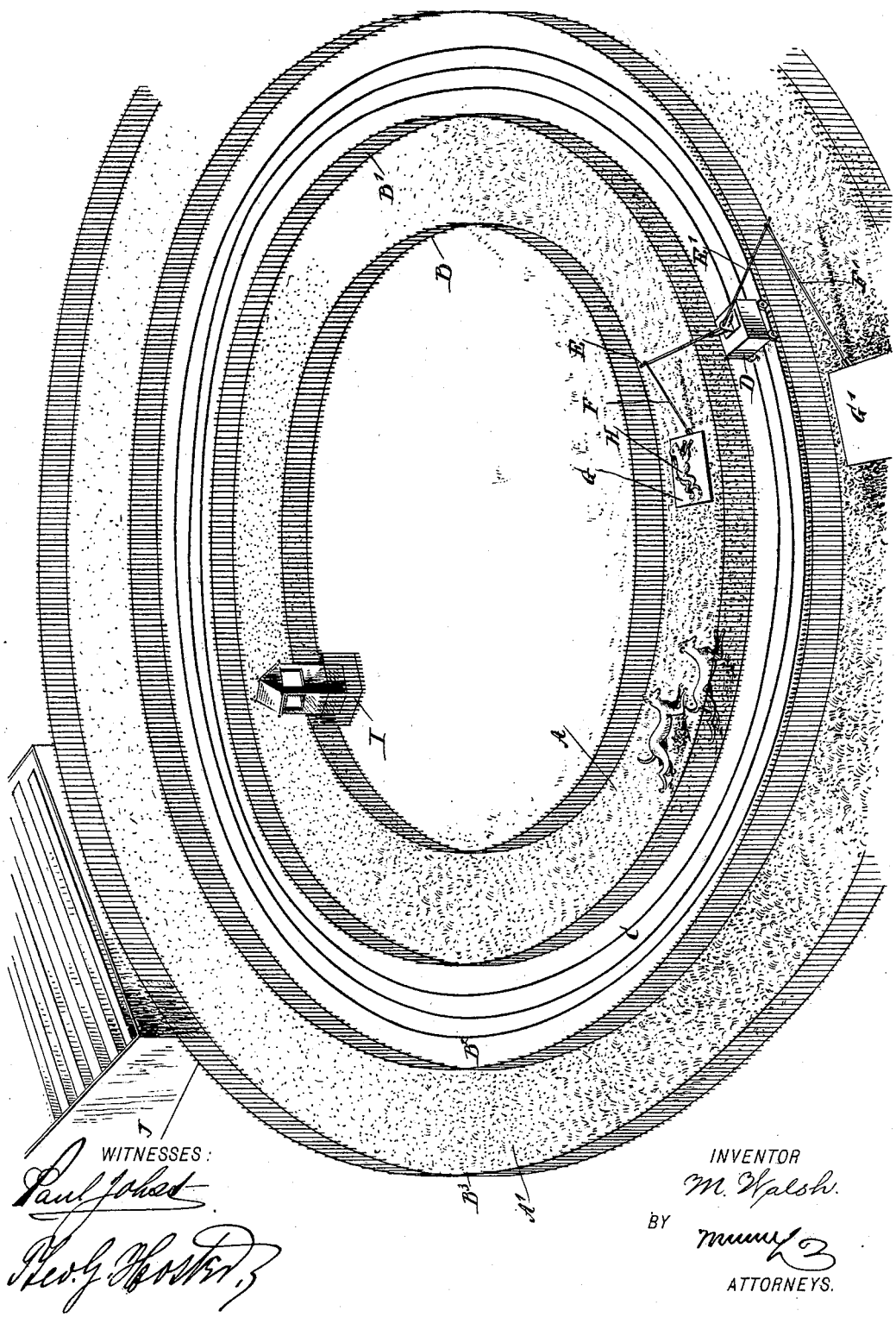
WITNESSES:
INVENTOR
M. Walsh.
BY
ATTORNEYS.

UNITED STATES PATENT OFFICE.

MICHAEL WALSH, OF NEW YORK, N. Y.

RACE-TRACK FOR DOGS.

SPECIFICATION forming part of Letters Patent No. 611,876, dated October 4, 1898.

Application filed September 28, 1897. Serial No. 653,350. (No model.)

*To all whom it may concern:*

Be it known that I, MICHAEL WALSH, of New York city, in the county and State of New York, have invented a new and Improved Race-Track for Dogs, of which the following is a full, clear, and exact description.

The object of the invention is to provide a new and improved race-track for testing the speed of dogs and other animals in such a manner that the animals during the run are completely unencumbered by harness, riders, or the like, so as to fully bring out the animals' speed qualities.

The invention consists of novel features, parts, and combinations of the same, as hereinafter more fully described, and pointed out in the claims.

Reference is to be had to the accompanying drawing, forming a part of this specification, in which the figure is a perspective view of the improvement.

In a field suitably selected for a race-course is formed one or more tracks A A', preferably arranged concentric to each other and of an oval, circular, or other form, with the tracks inclosed by suitable fences or railings B B' and B$^2$ B$^3$, respectively, as plainly indicated in the drawing. Between the tracks A A'— that is, between the fences B' B$^2$—is arranged a railway-track C for a motor D to travel on, the said railway-track being preferably provided with an underground-trolley system for delivering electricity to the apparatus in the motor D, so as to propel the latter at a desired speed around the track C.

From the motor D extend poles E E' in transverse directions over the fences B' B$^2$ and reach over into the tracks A A' a suitable distance above the ground thereof, and from the ends of the poles E E' extend downward and rearward the ropes, rods, or poles F F', respectively, connected at their lower ends with supports G G', respectively, made of rubber, canvas, or other suitable material, preferably flexible, so as to readily conform to the undulations of the ground in the tracks A A' and the grass and other vegetable matter therein.

On each of the supports G is secured a dummy hare H or like object in plain view of the dogs or other animals following the support in the tracks, as indicated in the drawing. The race-course is also provided with the judge's stand I and a grand stand J for spectators sufficiently elevated to enable the persons seated therein to watch the running of the animals in the race-track.

As shown in the drawing, two tracks are employed; but it is evident that a race-course may be built with but one track, and it is also evident that other suitable mechanical means may be employed for pulling the support G rapidly along in the track for the animals to follow with the hare or dummy in plain view of the animals.

The motor D is arranged in such a manner that its speed is controlled from the judge's stand or other place to always have the support in advance of the following dogs.

Now in starting the race the dogs (preferably greyhounds) entered for testing their speed are held in the track at the starting-point with the support G and motor D somewhere in advance and moving, so that upon releasing the animals they follow the dummy carried on the support around the track to the starting-point, it being understood that greyhounds, for instance, follow the dummy by sight and not by scent.

Now it is evident that by the arrangement described the animals are completely unencumbered by harness, riders, or the like, and hence are free to follow at their utmost speed the fleeing object in front of them to fully bring out their speed qualities.

Having thus fully described my invention, I claim as new and desire to secure by Letters Patent—

1. A race-track for dogs, comprising a continuous track for the animals to run on, a support movable in the said track and adapted to support a dummy hare or other object in view of the animals following in the track, and mechanical means located outside of the track and connected with the said support to move the latter around in the track in advance of the following animals, substantially as shown and described.

2. A race-track for dogs, comprising a track for the animals to run on, a support movable in the said track, and adapted to carry a dummy hare or other object, in view of the animals following on the track, and a motor mounted to travel, and connected with the said support, to move the latter around in the track in advance of the following animals, substantially as shown and described.

3. A race-track for dogs, comprising a track for the animals to run on, a railroad-track adjacent to but separated from the said race-track, a motor mounted to travel on the said railroad-track, and a support carried by the said motor, and arranged to be dragged along in the said race-track, substantially as shown and described.

4. A race-track for dogs, comprising a track for the animals to run on, a railroad-track adjacent to but separated from the said race-track, a motor mounted to travel on the said railroad-track, and a support carried by the said motor, and arranged to be dragged along in the said race-track, the said support being of a flexible material, and adapted to carry a dummy hare or other object, substantially as shown and described.

5. A race-track for dogs, comprising a track for the animals to run on, a flexible support adapted to be dragged in the said track, a motor mounted to travel adjacent to the track, a pole carried by the said motor, and a connection between the said pole and the said support, substantially as shown and described.

MICHAEL WALSH.

Witnesses:
 THEO. G. HOSTER,
 JNO. M. RITTER.